(12) United States Patent
Konradi et al.

(10) Patent No.: US 9,389,120 B2
(45) Date of Patent: Jul. 12, 2016

(54) SPECTRAL DETECTOR OR LASER SCANNING MICROSCOPE HAVING VARIABLE FILTRATION USING SPATIAL COLOR SEPARATION

(75) Inventors: Jakow Konradi, Erfurt (DE); Daniel Schwedt, Jena (DE); Enrico Geissler, Jena (DE); Günter Rudolph, Jena (DE); Hans-Jürgen Dobschal, Kleinromstedt (DE)

(73) Assignee: Carl Zeiss Microscopy GmbH, Jena (DE)

( * ) Notice: Subject to any disclaimer, the term of this patent is extended or adjusted under 35 U.S.C. 154(b) by 623 days.

(21) Appl. No.: 13/499,441

(22) PCT Filed: Aug. 28, 2010

(86) PCT No.: PCT/EP2010/005294
§ 371 (c)(1),
(2), (4) Date: Apr. 26, 2012

(87) PCT Pub. No.: WO2011/038816
PCT Pub. Date: Apr. 7, 2011

(65) Prior Publication Data
US 2012/0218547 A1     Aug. 30, 2012

(30) Foreign Application Priority Data
Sep. 30, 2009  (DE) .................. 10 2009 043 745

(51) Int. Cl.
*G01J 3/28*  (2006.01)
*G01J 3/02*  (2006.01)
(Continued)

(52) U.S. Cl.
CPC .. *G01J 3/02* (2013.01); *G01J 3/021* (2013.01); *G01J 3/0205* (2013.01); *G01J 3/0291* (2013.01); *G01J 3/18* (2013.01); *G02B 21/004* (2013.01); *G02B 21/0032* (2013.01); *G02B 21/22* (2013.01)

(58) Field of Classification Search
CPC ................. G01J 3/02; G01J 3/28; G01J 3/10; G01J 3/2803; G01J 3/2823
USPC ................................... 356/300–334
See application file for complete search history.

(56) References Cited

U.S. PATENT DOCUMENTS 5,504,575 A   4/1996  Stafford
5,886,784 A   3/1999  Engelhardt
(Continued)

FOREIGN PATENT DOCUMENTS

DE   199 15 137   10/2000
DE   100 33 180   5/2002
(Continued)

OTHER PUBLICATIONS

Butler M et al.; "Digital-transform spectroscopy shows its versatility" Laser Focus World, Pennwell, Tulsa, OK, US, vol. 41, No. 9, Sep. 1, 2005, pp. 82-85, XP009086634.
(Continued)

*Primary Examiner* — Abdullahi Nur
(74) *Attorney, Agent, or Firm* — Frommer Lawrence & Haug LLP

(57) ABSTRACT

Laser scanning microscope or spectral detector having a detection beam path and first imaging optics which image spectrally dispersed sample light in a Fourier plane such that the individual spectral components of the sample light are spatially separated from one another therein. A micromirror arrangement is provided in this plane, and a spectrally selective change in direction of the detection beam is carried out by controlling the micromirrors, where a useful light component of the detection beam arrives on a detector. At least one second micromirror arrangement and a 1:1 imaging of the first micromirror arrangement in the second micromirror arrangement is provided. Alternatively, the same micromirror arrangement is passed at least twice, where, in the light path between the first pass and second pass, a spatial offset of the light beam of at least the first pass and second pass is generated on the micromirror arrangement by optical means.

33 Claims, 14 Drawing Sheets

(51) Int. Cl.
*G01J 3/18* (2006.01)
*G02B 21/00* (2006.01)
*G02B 21/22* (2006.01)

(56) References Cited

U.S. PATENT DOCUMENTS

| | | | |
|---|---|---|---|
| 6,377,344 B2 | 4/2002 | Schoeppe | |
| 6,396,053 B1 | 5/2002 | Yokoi | |
| 6,459,484 B1 | 10/2002 | Yokoi | |
| 6,583,940 B2 | 6/2003 | Nishikawa et al. | |
| 6,677,344 B2 | 1/2004 | Fukami et al. | |
| 6,750,036 B2 | 6/2004 | Bearman et al. | |
| 6,809,815 B2 | 10/2004 | Knebel | |
| 6,852,967 B2 | 2/2005 | Engelhardt et al. | |
| 6,954,306 B2 | 10/2005 | Engelhardt | |
| 6,977,724 B2 | 12/2005 | Knebel | |
| 7,006,310 B2 * | 2/2006 | Karube et al. | 359/891 |
| 7,190,451 B2 | 3/2007 | Seyfried et al. | |
| 7,212,338 B2 | 5/2007 | Weyh et al | |
| 2002/0027720 A1 | 3/2002 | Nishikawa et al. | |
| 2008/0283723 A1 | 11/2008 | Fujimori et al. | |

FOREIGN PATENT DOCUMENTS

| | | |
|---|---|---|
| DE | 10102033 | 8/2002 |
| DE | 101 51 217 | 4/2003 |
| DE | 102004031049 | 1/2006 |
| DE | 10 2007 002583 | 5/2008 |
| JP | 2000-314839 | 11/2000 |
| JP | 2002-006257 | 1/2002 |
| JP | 2008-286584 | 11/2008 |

OTHER PUBLICATIONS

International Search Report for Application No. PCT/EP2010/005294 dated Feb. 25, 2011.
Notification of Translation of the International Preliminary Report on Patentability dated Septembe Apr. 12, 2012 International Bureau of WIPO, Swlitzerland.
Notification of Reasons for Rejection for Japanese Application No. 2012-531253 dated Apr. 8, 2014.

* cited by examiner

SPECTRAL DETECTOR OR LASER SCANNING MICROSCOPE HAVING VARIABLE FILTRATION USING SPATIAL COLOR SEPARATION

The present application claims priority from PCT Patent Application No. PCT/EP2010/005294 filed on Aug. 28, 2010, which claims priority from German Patent Application No. DE 10 2009 043 745.2 filed on Sep. 30, 2009, the disclosures of which are incorporated herein by reference in their entirety.

BACKGROUND OF THE INVENTION

1. Field of the Invention

The invention is directed to a laser scanning microscope or spectral detector having a detection beam path and at least first imaging optics which image spectrally dispersed sample light in a Fourier plane in such a way that the individual spectral components of the sample light are spatially separated from one another therein. A micromirror arrangement is provided in this plane, and a spectrally selective change in direction of the detection beam is carried out by controlling the micromirrors, where a useful light component of the detection beam arrives on a detector. In order to improve the spectral selection, at least one second micromirror arrangement and a 1:1 imaging of the first micromirror arrangement in the second micromirror arrangement is provided. Alternatively, the same micromirror arrangement is passed at least twice, where, in the light path between the first pass and second pass, a spatial offset of the light beam of at least the first pass and second pass is generated on the micromirror arrangement by optical means.

2. Description of Related Art

U.S. Pat. No. 5,504,575B1 describes an optical arrangement and method for spectral characterization of an input beam by means of a spatial light modulator (SLM). In a construction with a micromirror arrangement (digital mirror device—DMD), only selected spectral components are reflected in direction of the detector.

U.S. Pat. No. 6,750,036B2 describes an arrangement for spectrally resolved detection of the fluorescence signal of a cellular specimen with a plurality of dyes which are excited simultaneously. The object light is split spectrally and is received by a suitable array detector. The spectrum of the object light is received without filtering and can contain spectral components of excitation light.

U.S. Pat. No. 6,809,815B2 and U.S. Pat. No. 6,954,306B2 show optical arrangements for spectrally selective detection of the object light in a fluorescence microscope which contain a dispersive element for angular splitting of the spectral components of the object light. These arrangements act as bandpass filters and do not allow a flexible spectral filtering of the object light.

U.S. Pat. No. 5,886,784, U.S. Pat. No. 6,852,967B2 and U.S. Pat. No. 6,977,724B2 describe constructions with displaceable diaphragms. Accordingly, this arrangement allows simultaneous detection of a plurality of spectral regions of the fluorescent light. However, the quantity of detected regions is limited by the quantity of detector diaphragm units. Also, since the diaphragms employed only provide a bandpass filter function, this arrangement does not allow a flexible filtration of the spectrum of the object light.

DE 102004031049A1 describes an arrangement for the simultaneous detection of a plurality of spectral regions of the object light only by means of a one-channel detector. The selection of the radiation components to be detected is carried out by means of a blocking element. The unwanted components are blocked out of the detection beam path. This approach allows flexible filtering of the object light. However, due to the fact that only the integrated intensity is measured over all of the detected regions in this arrangement, no spectral characterization of the fluorescence is possible in this case. Further, a substantial thickness of the individual webs causes losses in intensity of the fluorescent light.

In DE 10102033B4, the object light is split spectrally and imaged on a multichannel detector. Reduction means are arranged in front of the dispersive element. However, since the filter function is only determined by the characteristics of the means used for reduction, a flexible spectral filtration of the object light is impossible.

U.S. Pat. No. 6,377,344B2 describes a device by which the illumination beam path, object beam path and detection beam path in a microscope are separated from one another purely geometrically. Additional subsequent filtration of the object light in front of the detector is necessary in this case.

DE 102007002583A1 describes a main color splitter based on the same approach as the arrangements and methods described in U.S. Pat. No. 6,377,344B2. The illumination beam path, object beam path and detection beam path in a microscope are separated from one another purely geometrically. For this purpose, a microstructured element comprising a DMD unit is used in the Fourier plane of a 4f arrangement to couple the desired spectral components of the illumination beam into the microscope in a specific manner. The suppression efficiency for scattered light is limited so that there is a need for additional subsequent filtering.

U.S. Pat. No. 7,212,338B2 describes the implementation of a spectral detector in a microscope, where the spectrum of the sample light is received by means of a detector. For this purpose, the light which is emitted by the sample and scattered at the sample is divided into its spectral components and imaged on a selectively switchable micromirror arrangement (digital mirror device—DMD) by means of suitable optics. The unwanted wavelengths of the beam are not detected. This enables additional suppression of the excitation light scattered at the sample. To capture a spectrum of the object light, the individual spectrally resolved components of the radiation are imaged in the detector successively in time. The intensities of the individual spectral regions give the total spectrum.

U.S. Pat. No. 6,396,053B1, U.S. Pat. No. 6,459,484B1 describe optical arrangements for simultaneous detection of a plurality of spectral regions of fluorescent light in a microscope. For this purpose, the object light is spectrally resolved on an arrangement comprising a plurality of deflecting micromirrors. Each micromirror is characterized by a plurality of tilting angles. Because of the scattering at the edges and surfaces of the individual micromirrors, the efficiency of suppression is limited.

U.S. Pat. No. 7,190,451B2 describes a further development of the optical arrangements described in U.S. Pat. Nos. 6,396,053B1 and 6,459,484B1. The device is augmented by a collimating lens which is inserted in the detection beam path between the micromirror unit and the detector. Accordingly, the individual spectrally resolved partial beams are imaged on the detector in parallel. Because of the scattering at the edges and surfaces of the individual micromirrors, the efficiency of suppression is likewise limited in this case to only about 3 OD.

SUMMARY OF THE INVENTION

Therefore, the object of the invention is to realize an additional efficient filtration of the object light with a suitable optical arrangement.

According to the invention, detection light which can still contain unwanted excitation light and which is directed to the detector from a pinhole or fiber is subjected to spectral filtration.

In the present approach, a grating for spectral splitting and a micromirror array—a MEMS (mirror) array—are used for this purpose to select the desired (e.g., fluorescent) light and unwanted (excitation) light.

The extremely high separating quality, for example, at least OD6, is advantageously achieved by means of double modulation through one and the same MEMS array or a substantially identical mirror array having a second, spatially offset beam passage.

To this end, a 1:1 imaging system is advantageously used for refocusing. Further, both the MEMS and the prism are advantageously used for the forward beam path and return beam path in order to realize a compact and economical construction.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
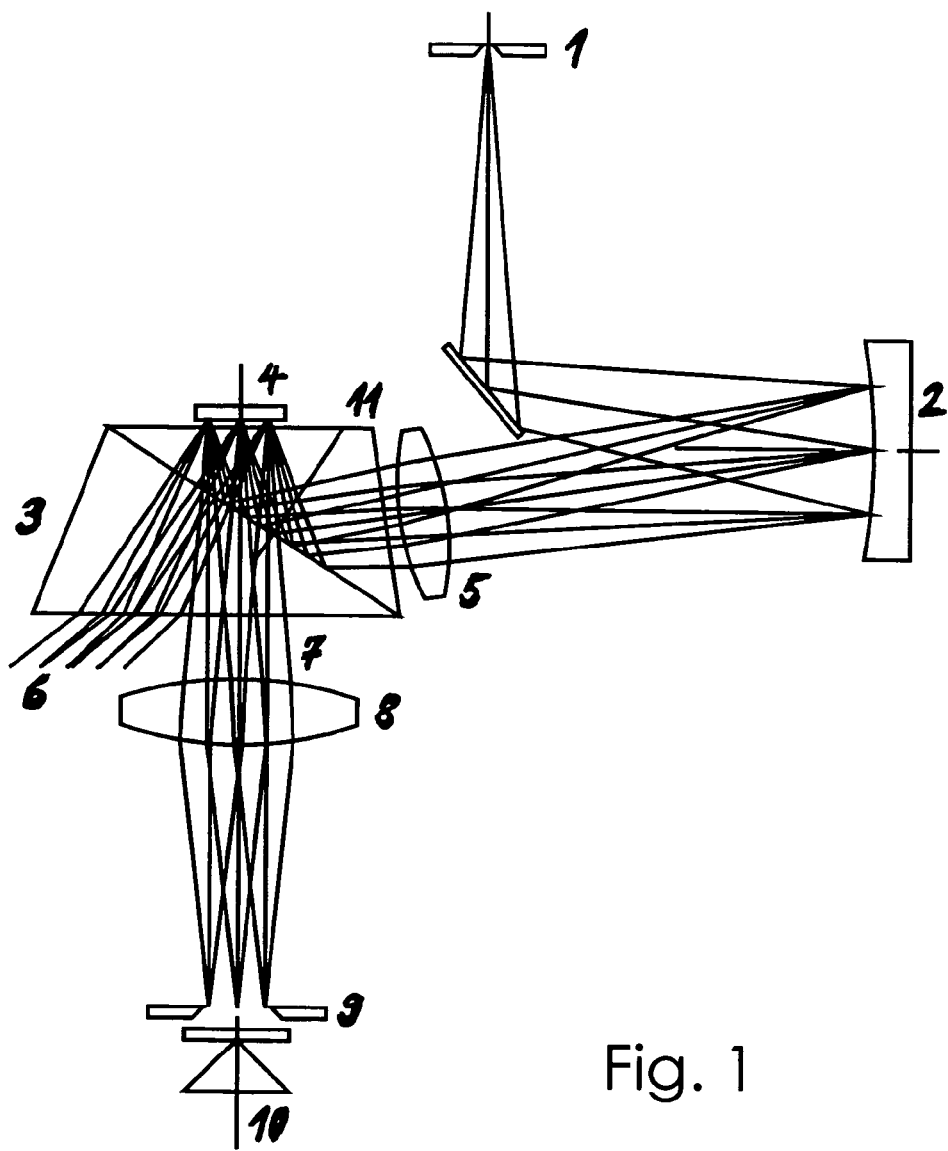
FIG. 1 shows an arrangement of one embodiment of the current invention.

With reference to FIG. 1, after deflection by a mirror 11, polychromatic light from a pinhole or fiber end 1 is spectrally dispersed through an imaging grating 2 and is imaged on a DMD 4 via a TIR prism 3.

The TIR prism preferably comprises two cemented individual prisms with an air gap. Substantially perpendicular light passes the interface between the prisms, but oblique light (at a corresponding angle) undergoes total reflection.

A field lens 5 in front of the prism 3 aligns the principal beams of the individual color bundles parallel to one another and accordingly generates identical incident angles in the plane of the DMD 4.

In accordance with the angular position of the individual mirrors of the DMD 4, unwanted wavelengths are reflected into the off-light channel 6, and the desired wavelengths are reflected into the on-light channel 7. The off-light 6 arrives in a light trap (not shown). The on-light 7 is concentrated through a lens 8 in a pupil plane 9. A non-spatially resolved plane detector 10 arranged therein determines the intensity of the wavelength(s) selected at the DMD 4.

Figure 2:
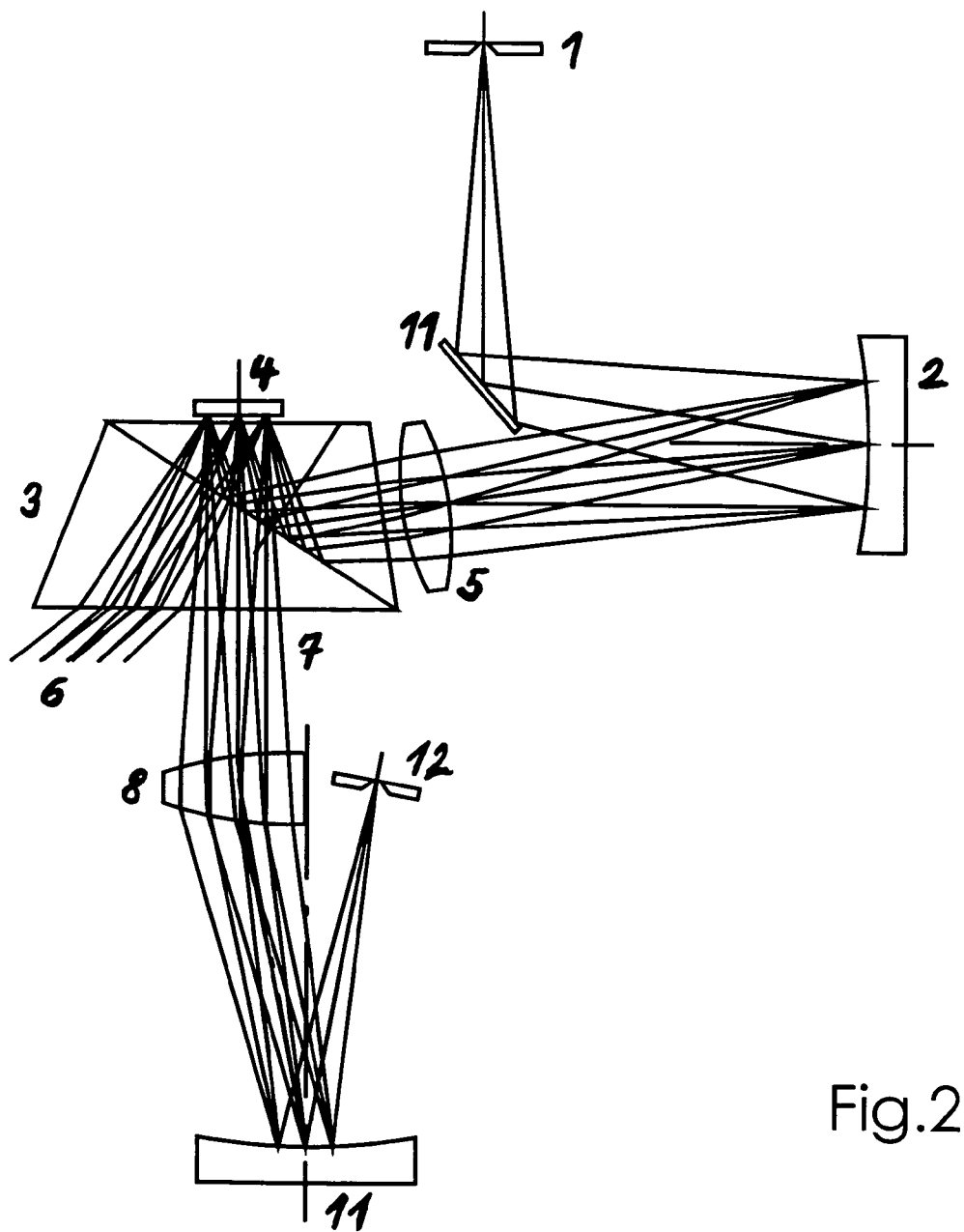
FIG. 2. shows an arrangement of another embodiment of the current invention.

The arrangement shown in FIG. 2 differs from the arrangement according to FIG. 1 in that a second imaging grating 11 is arranged in the pupil plane 9 following the DMD 4 and recombines the differently colored bundles selected at the DMD 4 on a common axis and accordingly generates an image of the first pinhole or fiber input 1. Therefore, the detector can be designed as a point detector, or the color-selected light can be coupled into a fiber or pinhole 12. In this case, the lens 8 can be a half-lens with respect to its optical efficiency in order to ensure blocking out via 11 in direction 12 in a space-saving manner; of course, blocking may also be carried out differently as would be inferred by the person skilled in the art.

Figure 3:
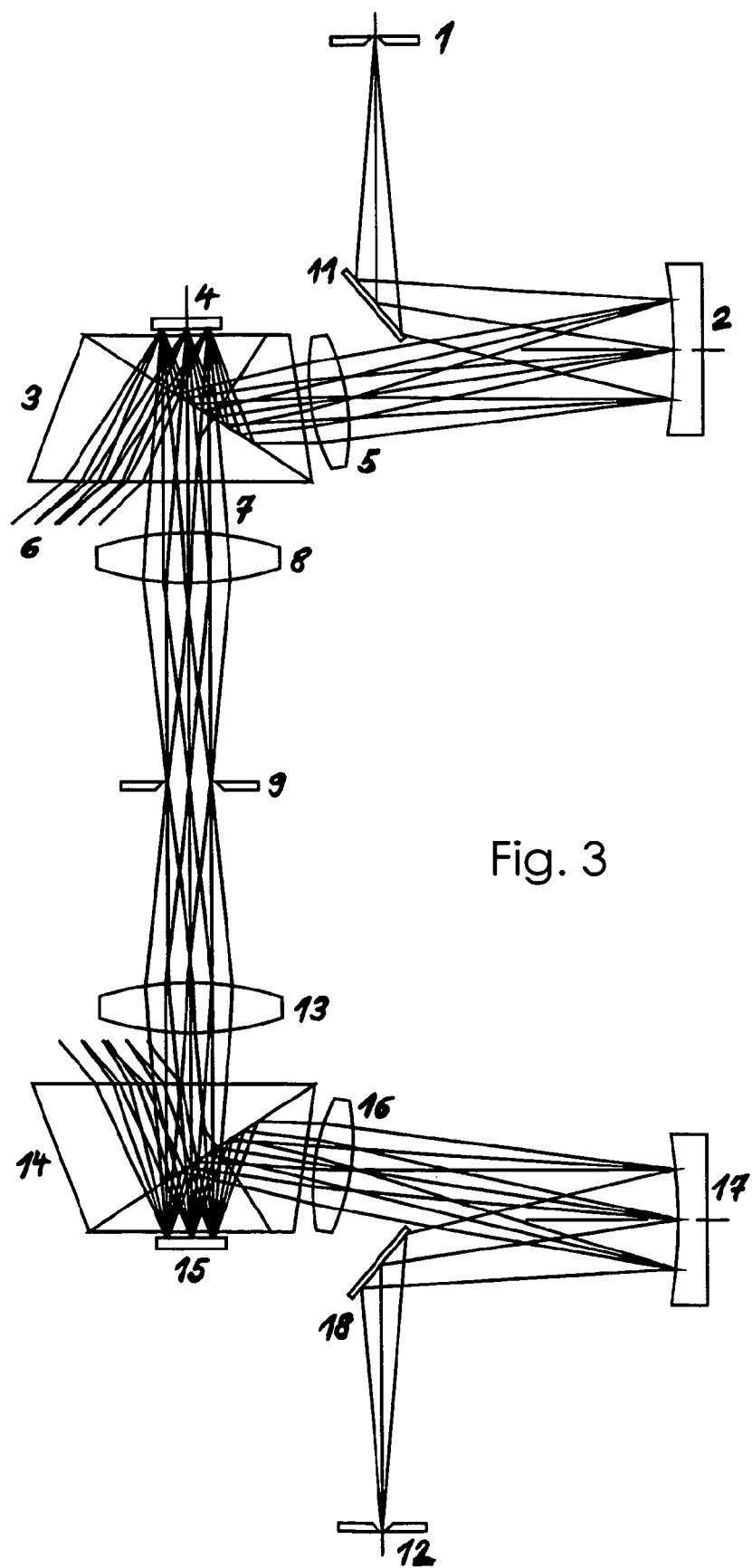
FIG. 3. shows an arrangement of yet another embodiment of the current invention.

The arrangement according to FIG. 3 is expanded over the arrangement according to FIG. 1 by a second TIR prism 14 and a second DMD 15. Another lens 13 arranged after the pupil plane 9, together with the preceding lens 8, generates a telecentric 1:1 imaging of the first DMD plane 4 on the second DMD plane 15. In this case, the wavelength-dependent selection of the first DMD 4 can be repeated, which results in a considerable improvement in suppression of unwanted wavelengths.

An increase in the optical attenuation of unwanted spectral components of OD3 to OD6, for example, can be achieved. The selected bundles are guided via a second field lens 16 to a second imaging grating 17 which, as in the arrangement according to FIG. 2, carries out a recombination of differently colored bundles on a common axis. The selected light can again be received by a point detector via a mirror 18 or can be coupled into a fiber or pinhole 12.

Figure 4:
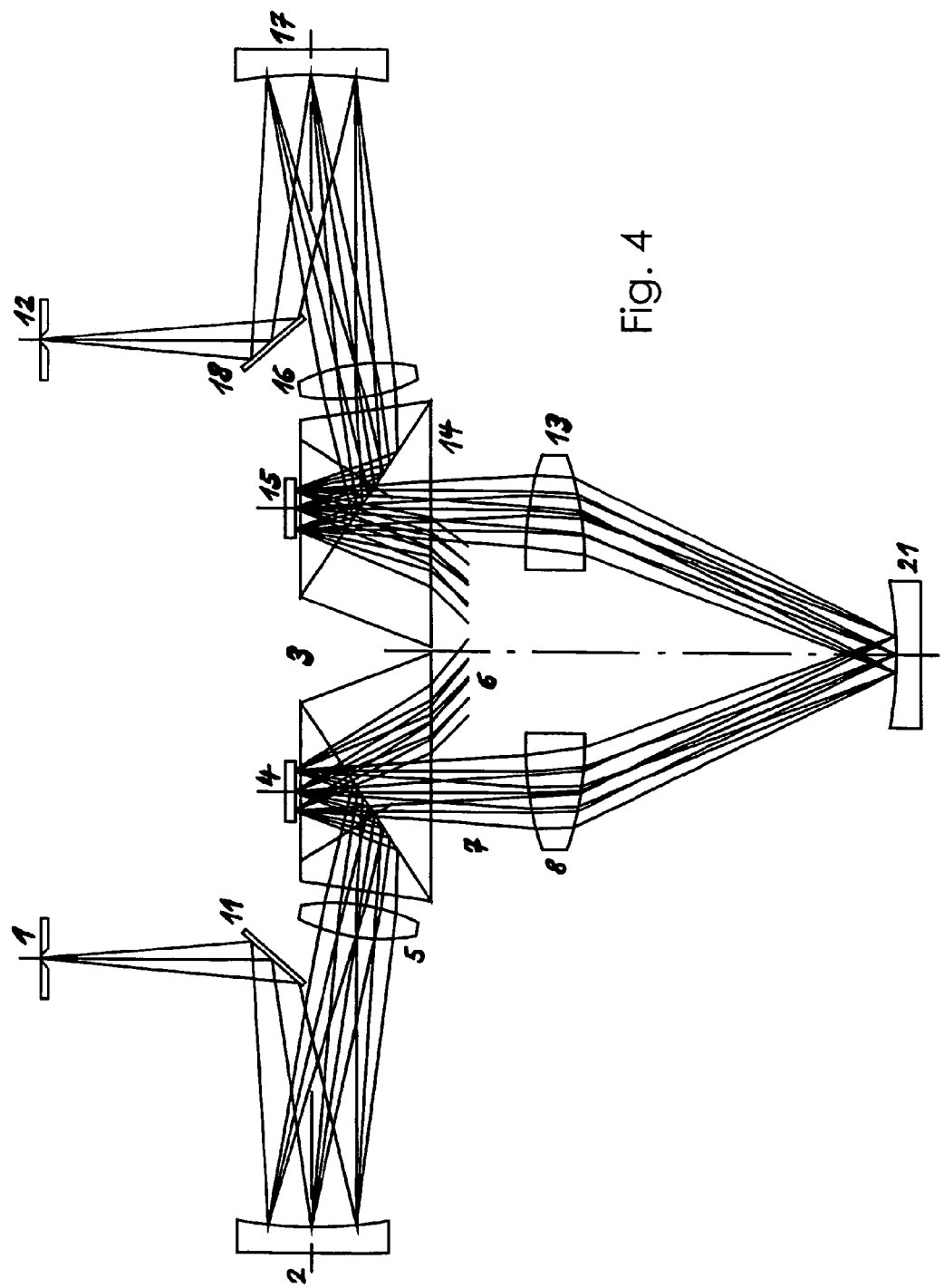
FIG. 4. shows an arrangement of again another embodiment of the current invention.

The arrangement shown in FIG. 4 corresponds (with mirror-image input coupling) to the arrangement according to FIG. 3, except that a catadioptric system (e.g., a Dyson system) is used for the 1:1 imaging of the first DMD plane on the second DMD plane. It comprises lenses 8 and 13 and a curved mirror 21 (e.g., spherically curved mirror). This economizes on the optical-mechanical resources for 1:1 imaging. All of the other elements and functions correspond to those of the arrangement shown in FIG. 3.

Figure 5:
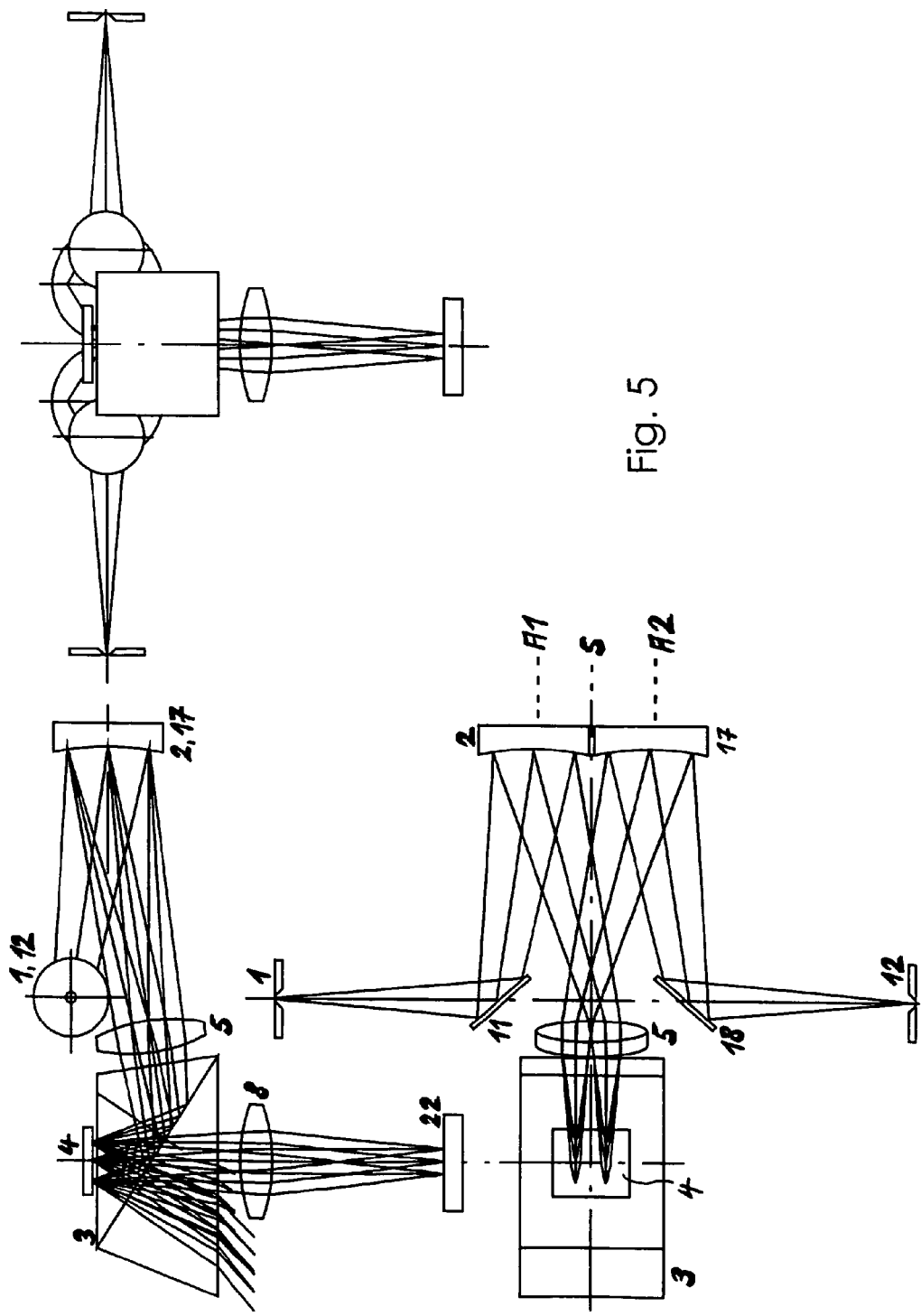
FIG. 5. shows an arrangement of a further embodiment of the current invention.

FIG. 5 shows on top a side view of the top view below. The arrangement according to FIG. 5 achieves a two-fold wavelength-dependent selection as in the arrangement according to FIG. 3, but without a second TIR prism and second DMD. To this end, the first imaging grating 17 is arranged so as to be decentered with respect to the field lens 5, TIR prism 3 and DMD 4 as is shown in the top view. By "decentered" is meant that the plane of symmetry S of the optical arrangement does not coincide with the optical center axes A1, A2 of the gratings 2 and 17.

Accordingly, the generated spectrum lies on the DMD 4 so as to be decentered. The wavelength-dependent selection is carried out as in the arrangements described above. As before, the on-light 8 is concentrated through a lens in direction of the pupil 9. Instead of a detector, a mirror 22 which reflects the light back to the DMD 4 is used in this case. Because of the lateral decentering of the first spectrum on the DMD 4, the returning bundles strike the DMD 4 at a lateral offset which corresponds to two times the decentering of the first spectrum. At this point, the second wavelength-dependent selection is carried out through different mirror elements of the DMD 4 than those in the first detection. The on-light of the second selection is guided to the point detector or fiber output 12 via the TIR prism 3, the field lens 5, a second decentered imaging grating 17 and mirror 18.

Figure 6:
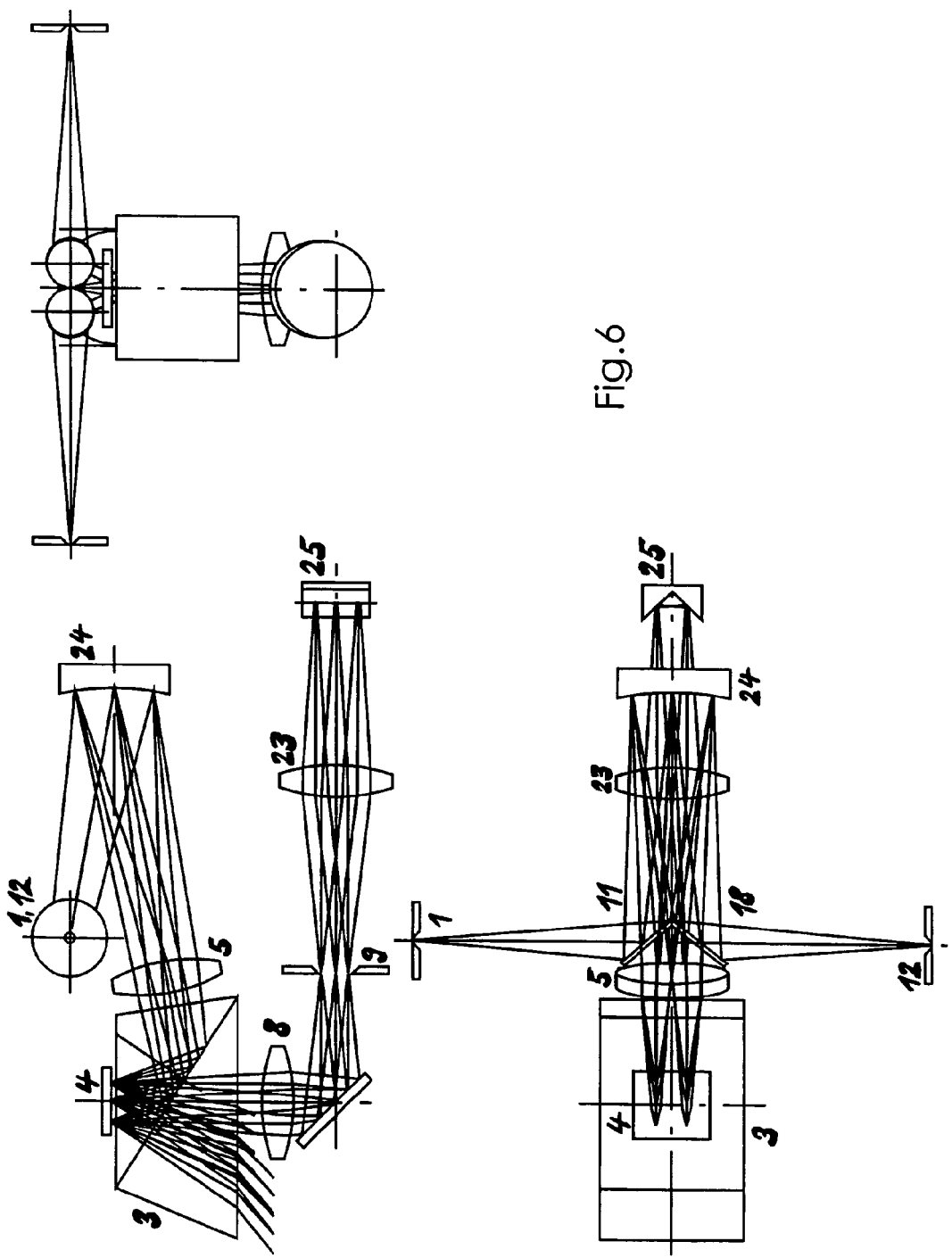
FIG. 6. shows an arrangement of yet a further embodiment of the current invention.

With reference to FIG. 6, a top view and, above this, a side view are again shown. A two-fold wavelength-dependent selection without a second TIR prism or second DMD is also achieved with the arrangement according to FIG. 6. In addition, only one centered imaging grating 24 is also used for spectral splitting and recombination. The decentering of the first spectrum on the DMD 4 is generated by inclining the incident bundles. Since only one grating 24 is used in this arrangement for splitting and recombination, spectrum 1 and spectrum 2 must have the same orientation in contrast to the arrangement according to FIG. 5. This is achieved by means of an additional imaging after pupil 9.

An additional lens 23 generates an intermediate image of the spectrum 1 in the plane of symmetry of a roof mirror 25 and this intermediate image is then imaged on the DMD 4 with the correct orientation and the desired offset. After the second selection, the on-light is then guided to the point detector or fiber output 12 via field lens 5 and imaging grating 24 for recombining the spectral components.

The arrangements according to FIGS. 7 to 12 correspond to those in FIGS. 1 to 6 except that no TIR prism is used for separating on-light from off-light. With small fields and apertures, the separation can also be carried out through sufficiently long free path lengths. Resources and cost can be reduced in this way.

Figure 7:
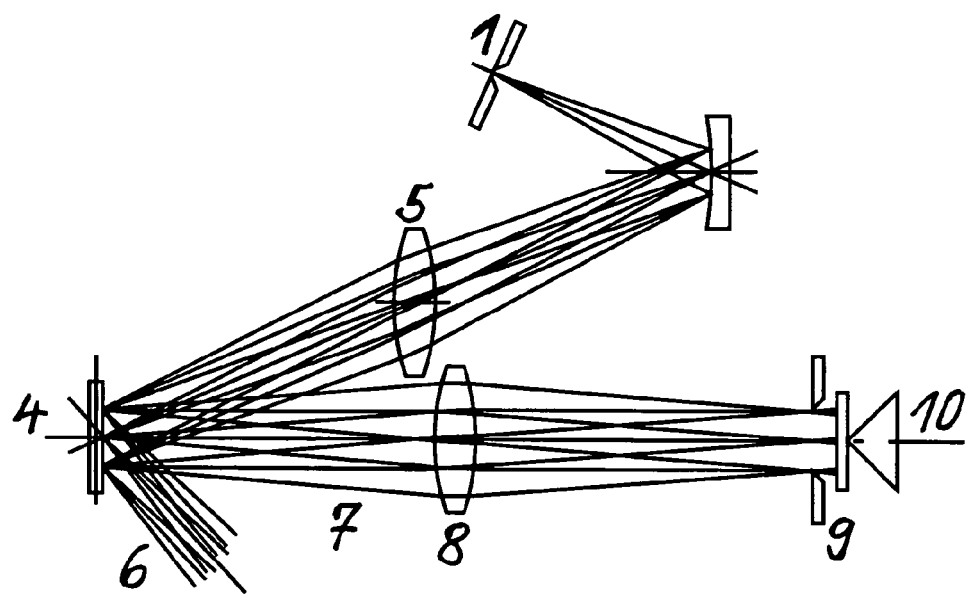
FIGS. 7 to 12 show embodiments similar to those shown in FIGS. 1 to 6 except that no TIR prism is used for separating on-light from off-light.
Figure 13:
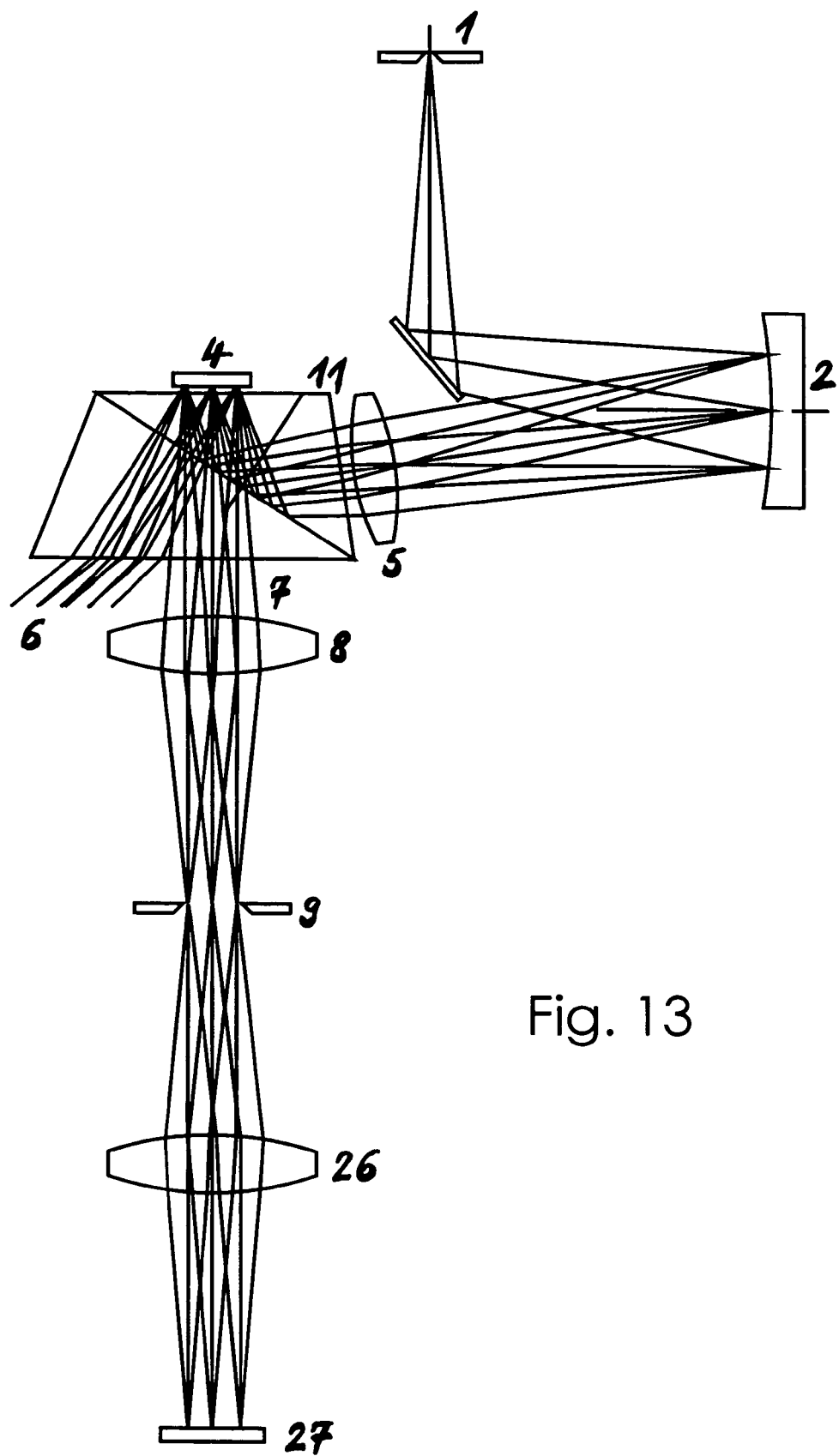
FIGS. 13 and 14 show embodiments similar to those shown in FIGS. 1 and 7, but instead of a flat detector in the pupil plane, additional imaging 26 generates an image of the spectrum on a spatially resolving detector 27.
Figure 14:
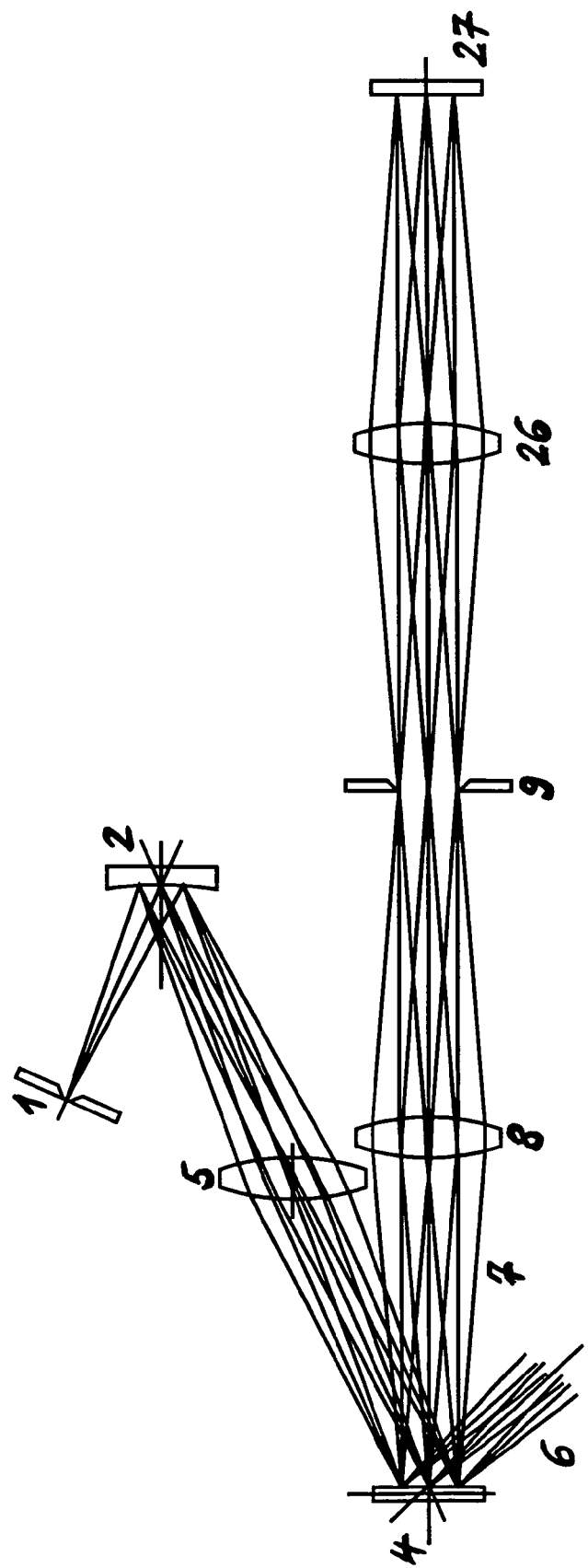

The arrangements according to FIGS. 13 and 14 correspond to those shown in FIGS. 1 and 7 but, instead of a flat detector in the pupil plane, additional imaging 26 generates an image of the spectrum on a spatially resolving detector 27.

FIG. 7 illustrates a spectral detector with DMD as variable spatial filter. A spectrum is generated through a grating, the spectrum is not recombined, and a large-area detector is arranged in a pupil plane.

Figure 8:
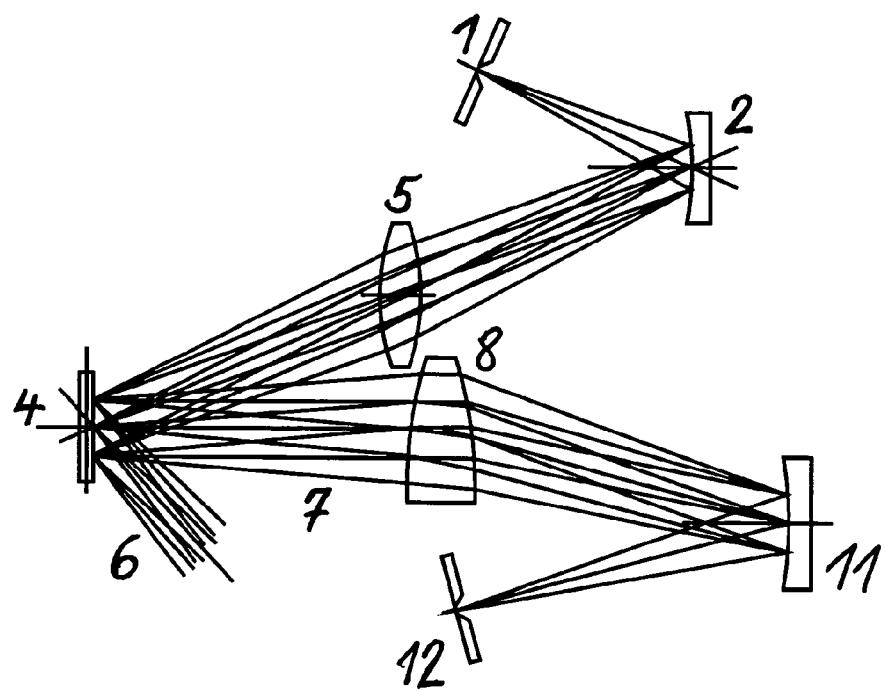

In FIG. 8, the spectrum is recombined and point out-coupling or point detection is carried out.

Figure 9:
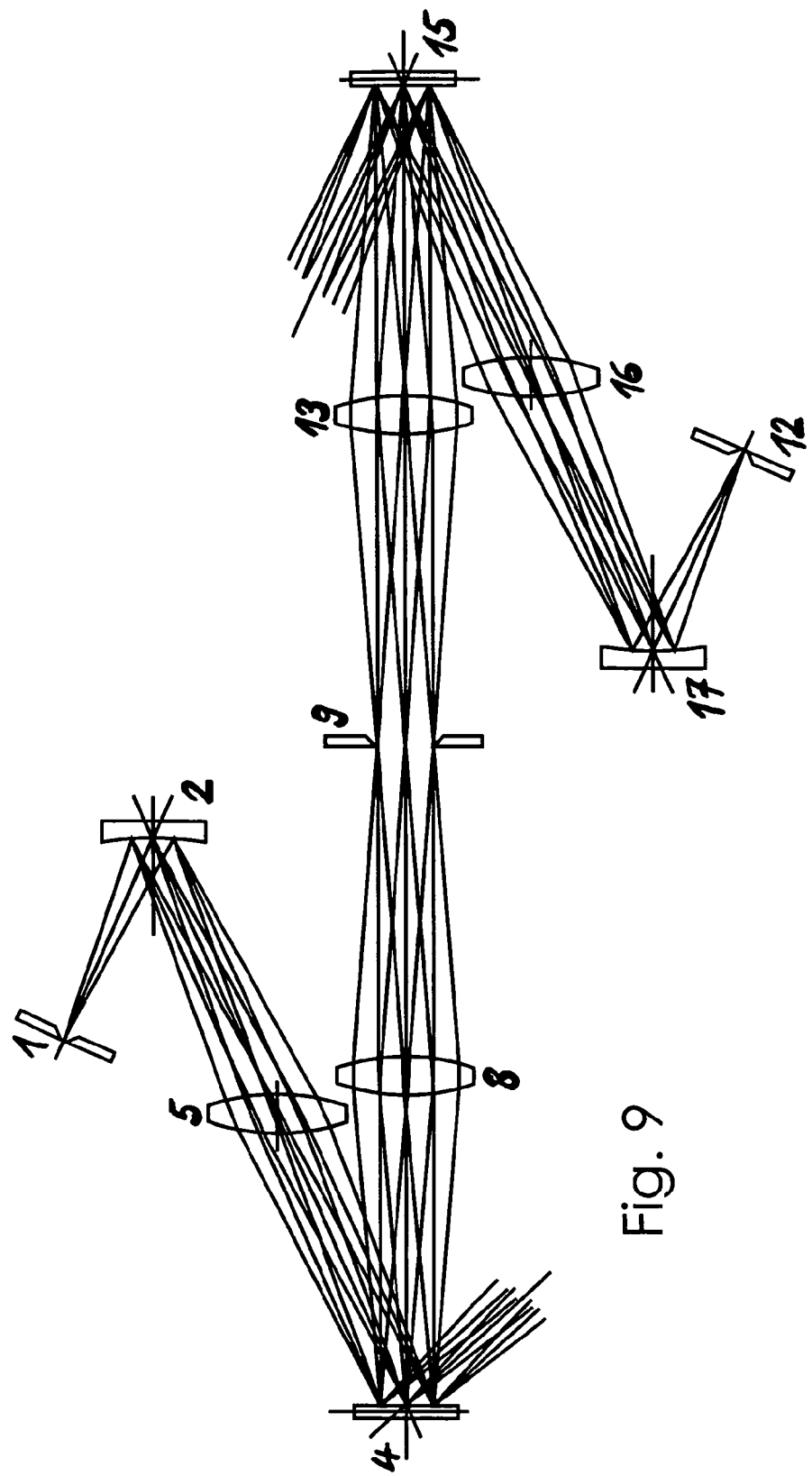

In FIG. 9, two DMDs are provided as variable spatial filters and lens optics are provided for 1.1 imaging; a recombination of the spectral components in a point is again carried out.

Figure 10:
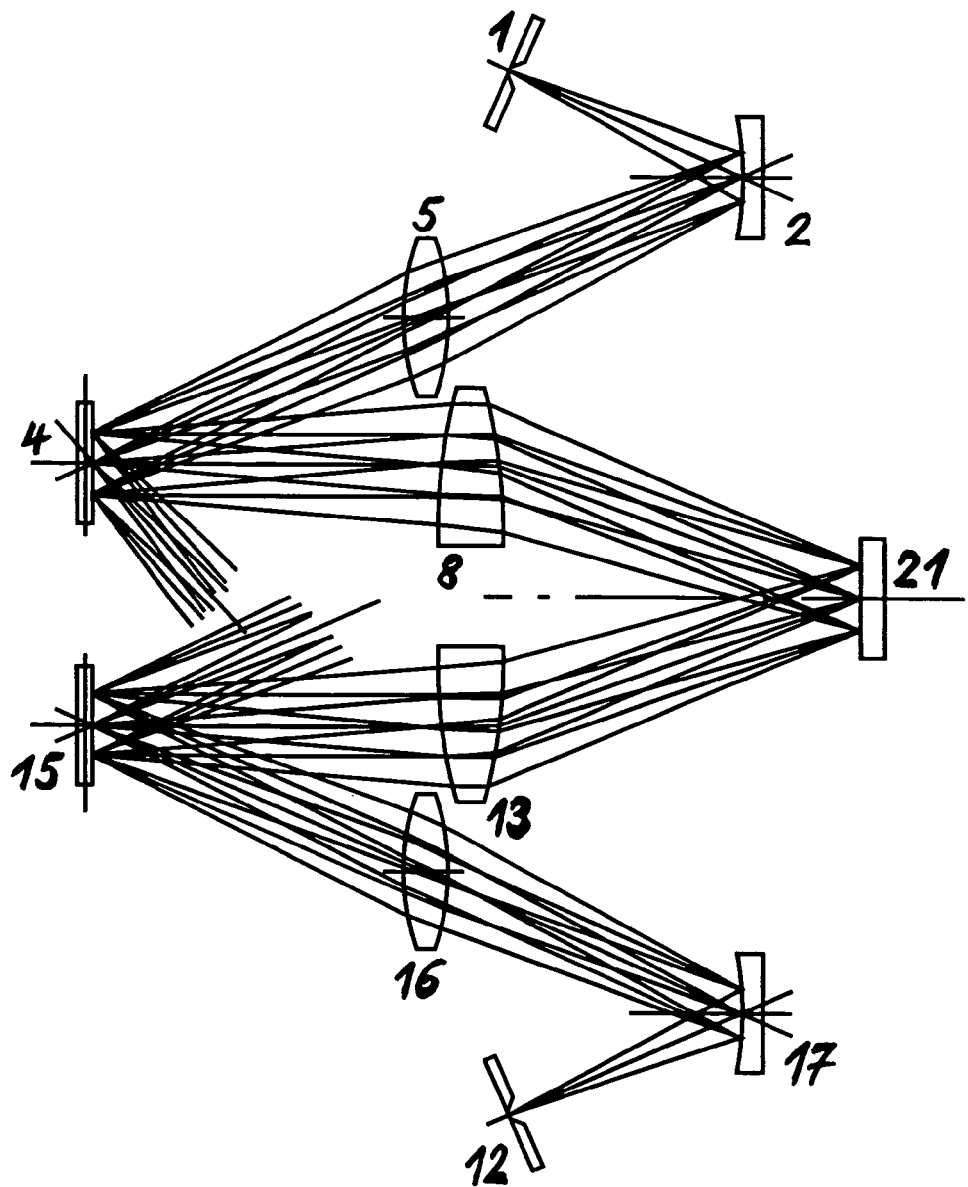

FIG. 10 contains mirror optics for 1:1 imaging.

Figure 11:
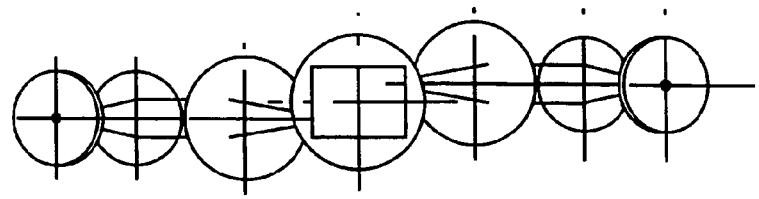
Figure 11:
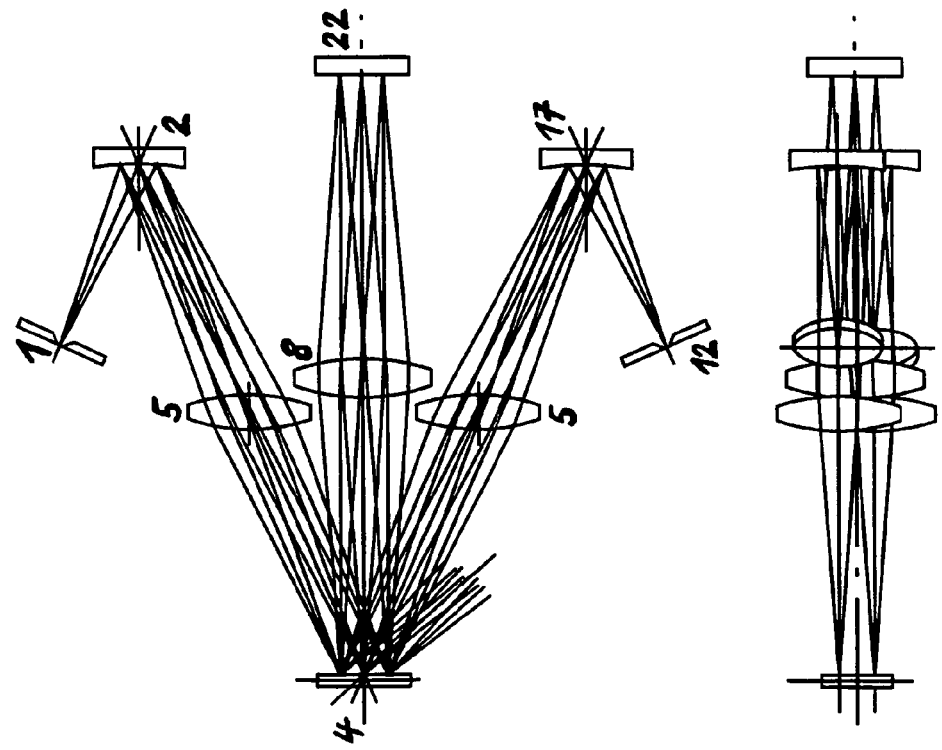

FIG. 11 contains, as variable spatial filter, the DMD which is used twice and mirror optics for 1:1 imaging.

Figure 12:
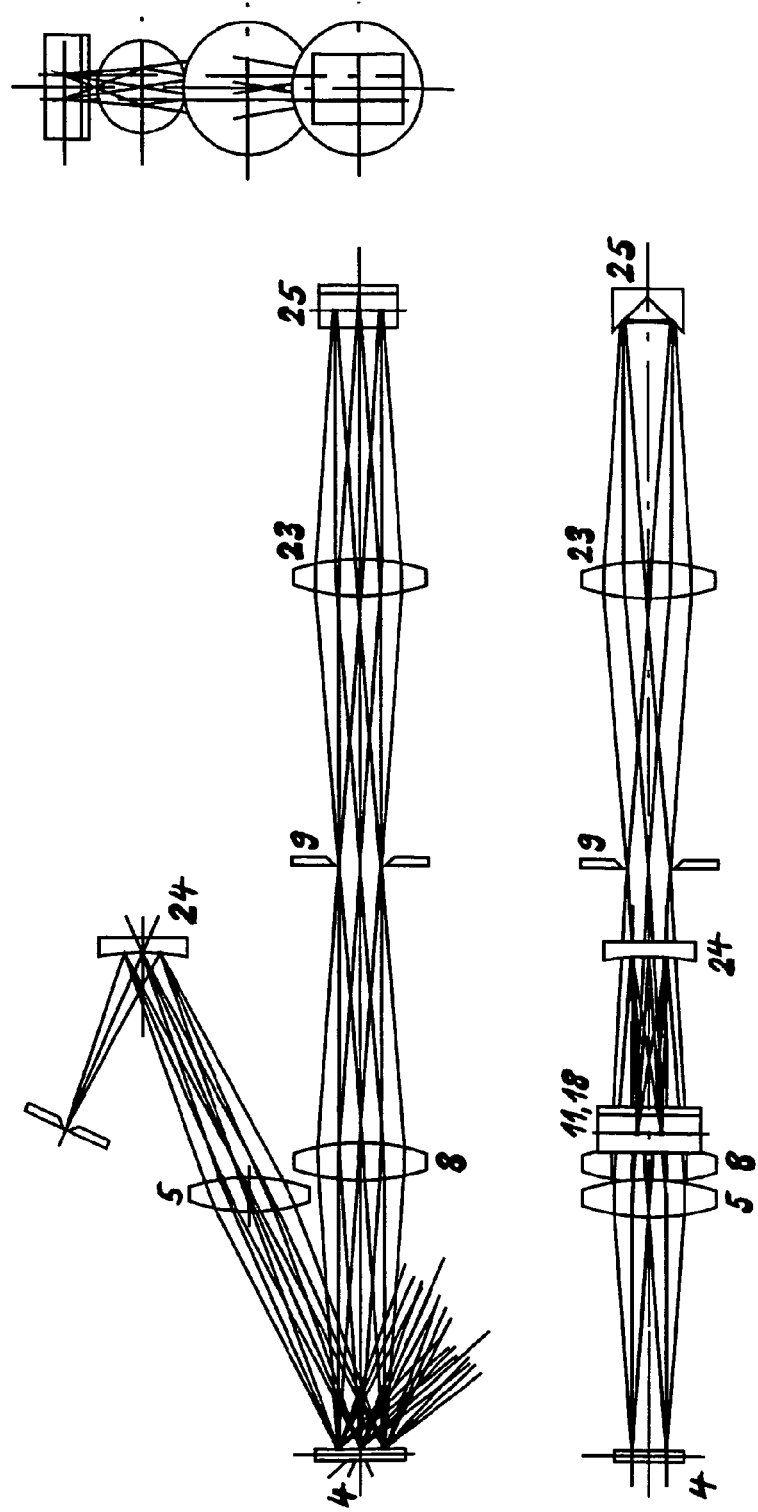

FIG. 12 contains the DMD which is used twice and lens optics for 1:1 imaging and a recombination at the same grating.

According to the invention, a MOEMS-based spectral detection filter in the arrangements shown above yields distinct advantages over the prior art with respect to application.

The greatest advantages with respect to application result from the great flexibility that is afforded in connection with the very short switching times and the high contrast produced. In particular, the following examples for possible applications are of interest:

Flexible Spectral Filter Design:

The filter can be adapted directly to the dyes and excitation light sources that are used. Accordingly, the filter with correspondingly adjustable excitation light sources aids in optimizing the excitation conditions based on the absorption characteristic of the dyes which are used and thus increases the contrast to autofluorescence because excitation can be carried out with lower intensity. This also applies in particular for dyes which have a very low Stokes shift between excitation and emission. Due to the increased edge steepness of the spectral filter compared with conventional edge filters, absorption maximum and emission maximum are barely curtailed, but back-scattered excitation light is suppressed very efficiently. Moreover, other unwanted spectral components can be suppressed in a simple manner if required (autofluorescence).

Parallelized Spectral Scanning and Spectroscopic Applications:

In principle, data which are spectrally resolved up to a few nanometers can be obtained for each individual picture point with a displaceable column in the Fourier plane of a spectrometer according to the prior art. However, due to start-stop movements which must be executed mechanically and an extensive set of data to be recorded, substantial recording times must be tolerated. Switching times in the microsecond range which are made possible by MOEMS accelerate this process enormously. Further, any desired column formats can be realized with MOEMS and, together with the use of a line detector (PMT, CCD, EMCCD, CMOS), the data recording process can be parallelized so that the quantity of images to be recorded is reduced, which increases the rate and relieves stress on the sample. In this way, a very fast separation of the signals of a sample dyed with a plurality of dyes is possible in the respective dye components (so-called emission fingerprinting, see also DE 19915137, DE 10151217).

Fast Multitracking and Excitation Fingerprinting

Due to the fast switching speed, the filter can also adapt to altered empirical conditions in the microsecond range. This allows, in principle, an extremely fast—even pixel-by-pixel—multitracking in which fluorescence transmission and laser suppression can be adjusted immediately. Further, a selective excitation and analysis of the dye components within a biological sample can be achieved in the same way with additional tuning of the excitation wavelength (excitation fingerprinting, see DE 10033180). Both techniques allow the dye components to be displayed separately in individual image channels.

Pinhole Adjustment:

When coupling in excitation light via the first MOEMS stage, excitation light and detection light both use the same pinhole. Consequently, there are no faulty alignments between the excitation spot on the sample and the pinhole. Further, no additional chromatic aberrations are generated by main beamsplitter solutions. Accordingly, the system is unconditionally suitable for FCS.

Reflection Measurements:

By selecting a smaller quantity of micromirrors than would be necessary for switching on the total excitation light to the beam path, a partial reflectivity of the component can be deliberately generated. Accordingly, confocal surface analyses which are impossible with confocal systems according to the current state of the art due to the high suppression of the excitation radiation in modern-day multilayer filters can be carried out by means of reflection measurements.

Of course, the invention is not literally limited to the embodiments shown herein, but rather can be changed and modified in various ways beyond the disclosed framework by the person skilled in the art.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMBERS 1 pinhole or fiber output
2 imaging grating
3 TIR prism
4 DMD
5 field lens
6 light in direction of light trap
7 useful light
8 lens
9 pupil plane
10 detector
11 deflecting mirror
12 fiber output or detection pinhole
13 lens
14 TIR prism
15 DMD
16 field lens
17 imaging grating
18 deflecting mirror
19 useful light
20 light in direction of light trap
21 curved mirror
22 plane mirror
23 lens
24 imaging grating
25 roof mirror
26 lens
27 spatially resolving detector

The invention claimed is:

1. A laser scanning microscope or spectral detector comprising:
   a detection beam path;
   at least first imaging optics which image spectrally dispersed sample light in a Fourier plane in such a way that the individual spectral components of the sample light are spatially separated from one another therein; and
   a micromirror arrangement provided in the Fourier plane;
   wherein the micromirrors of the micromirror arrangement are controlled to carry out a spectrally selective change in direction of the detection beam, where a useful light component of the detection beam arrives on a detector;
   wherein a TIR prism is provided between the first imaging optics and the micromirror arrangement or in front of the micromirror arrangement; and
   wherein the TIR prism reflects the detection light in direction of the micromirror arrangement and transmits the useful light component in the detection direction after spectral selection.

2. A laser scanning microscope or spectral detector comprising:
   a detection beam path;
   at least first imaging optics which image spectrally dispersed sample light in a Fourier plane in such a way that the individual spectral components of the sample light are spatially separated from one another therein; and
   a micromirror arrangement provided in the Fourier plane;
   wherein the micromirrors of the micromirror arrangement are controlled to carry out a spectrally selective change in direction of the detection beam, where a useful light component of the detection beam arrives on a detector;
   wherein the input coupling of the sample light into the micromirror arrangement, and the output coupling of the light to be detected and of the light to be blocked out of the micromirror arrangement, is carried out by a TIR prism which increases the angular difference generated by the micromirror arrangement between the light components to be detected and the light components to be blocked in such a way that the beam paths of the light components to be blocked are not detected through a free aperture of collimating optics arranged downstream of the micromirror arrangement.

3. A laser scanning microscope or spectral detector comprising:
   a detection beam path;
   at least first imaging optics which image spectrally dispersed sample light in a Fourier plane in such a way that the individual spectral components of the sample light are spatially separated from one another therein; and
   a micromirror arrangement provided in the Fourier plane;
   wherein the micromirrors of the micromirror arrangement are controlled to carry out a spectrally selective change in direction of the detection beam, where a useful light component of the detection beam arrives on a detector;
   wherein a generated angular dispersion is canceled by second imaging optics having a dispersive element arranged downstream of the micromirror arrangement for imaging in at least one of:
      a pinhole; and
      a point detector or a fiber end.

4. A laser scanning microscope or spectral detector comprising:
   a detection beam path;
   at least first imaging optics which image spectrally dispersed sample light in a Fourier plane in such a way that the individual spectral components of the sample light are spatially separated from one another therein; and
   a micromirror arrangement provided in the Fourier plane;
   wherein the micromirrors of the micromirror arrangement are controlled to carry out a spectrally selective change in direction of the detection beam, where a useful light component of the detection beam arrives on a detector;
   wherein a dispersive element is arranged in a pupil plane of collimating optics arranged downstream of the micromirror arrangement; and
   wherein the dispersive element is identical to an element used for spectral splitting of the sample light so that all spectral components of the sample light are recombined on a beam path and subsequently imaged on a detector.

5. The scanning microscope or spectral detector according to one of claims 1 to 4;
   wherein at least one imaging grating is provided for dispersion and imaging.

6. A laser scanning microscope or spectral detector comprising:
   a detection beam path;
   at least first imaging optics which image spectrally dispersed sample light in a Fourier plane in such a way that the individual spectral components of the sample light are spatially separated from one another therein; and
   a micromirror arrangement provided as a first micromirror arrangement in the Fourier plane;
   wherein the micromirrors of the first micromirror arrangement are controlled to carry out a spectrally selective change in direction of the detection beam, where a useful light component of the detection beam arrives on a detector;
   wherein at least a second micromirror arrangement is provided for improving spectral selection; and
   wherein a 1:1 imaging of the first micromirror arrangement in the second micromirror arrangement is provided.

7. The laser scanning microscope or spectral detector according to claim 6;
   wherein a TIR prism is arranged in front of the second micromirror arrangement.

8. The laser scanning microscope or spectral detector according to claim 6 or 7;
   wherein the 1:1 imaging is realized by means of a telecentric imaging system or a catadioptric system.

9. The laser scanning microscope or spectral detector according to claim 8;
   wherein the 1:1 imaging is realized by means of the catadioptric system, which comprises Dyson optics.

10. The laser scanning microscope or spectral detector according to claim 6, further comprising:
    an arrangement for 1:1 imaging comprising optical means which include an achromatically designed lens system.

11. The laser scanning microscope or spectral detector according to claim 6, further comprising:
    an arrangement for 1:1 imaging comprising optical means which include achromatic lenses and a curved mirror.

12. A laser scanning microscope or spectral detector comprising:
    a detection beam path;
    at least first imaging optics which image spectrally dispersed sample light in a Fourier plane in such a way that the individual spectral components of the sample light are spatially separated from one another therein; and
    a micromirror arrangement provided in the Fourier plane;
    wherein the micromirrors of the micromirror arrangement are controlled to carry out a spectrally selective change in direction of the detection beam, where a useful light component of the detection beam arrives on a detector;
    wherein the micromirror arrangement is passed at least twice for improving spectral detection; and
    wherein, in a light path between a first pass of the two passes and a second pass of the two passes, a spatial offset of the light beam of at least the first pass and the second pass is generated on the micromirror arrangement by optical means.

13. The laser scanning microscope or spectral detector according to claim 12, further comprising:
    optics which are arranged in a decentered manner for generating a first imaging and a second imaging of the dispersed light on the micromirror arrangement.

14. The laser scanning microscope or spectral detector according to claim 12 or 13;
    wherein a retroreflector is provided between the first pass and second pass in the beam path for generating a spatial offset.

15. The laser scanning microscope or spectral detector according to claim 12;
    wherein a 1:1 imaging is realized by means of a telecentric imaging system or a catadioptric system.

16. The laser scanning microscope or spectral detector according to claim 15;
    wherein the 1:1 imaging is realized by means of the catadioptric system, which comprises Dyson optics.

17. The laser scanning microscope or spectral detector according to claim 15 or 16, further comprising:
    an arrangement for 1:1 imaging comprising optical means which include an achromatically designed lens system.

18. The laser scanning microscope or spectral detector according to claim 15 or 16, further comprising:
    an arrangement for 1:1 imaging comprising optical means which include achromatic lenses and a curved mirror.

19. The laser scanning microscope or spectral detector according to one of claims 1-4, 6, and 12, further comprising:
    at least one spectrally dispersive element including a reflection grating.

20. The scanning microscope or spectral detector according to claim 19;
    wherein the reflection grating is an imaging reflection grating.

21. The scanning microscope or spectral detector according to one of claims 1-4, 6, and 12, further comprising:
    at least one spectrally dispersive element comprising a transmission grating.

22. The laser scanning microscope or spectral detector according to one of claims 1-4, 6, and 12, further comprising:
    at least one spectrally dispersive element comprising a prism.

23. The laser scanning microscope or spectral detector according to claims 1-4, 6, and 12, further comprising:
    wherein the micromirror arrangement is arranged in such a way that spatially separated components of the sample light are reflected by the micromirrors in a spectrally selective manner in two different spatial directions.

24. The laser scanning microscope or spectral detector according to one of claims 1-4, 6, and 12;
    wherein two output directions are distinctly separated from one another behind each micromirror arrangement inserted in the arrangement, and one of the two output directions is imaged in a beam trap.

25. The laser scanning microscope or spectral detector according to one of claims 1-4, 6, and 12;
    wherein the micromirror arrangement is a DMD matrix.

26. The laser scanning microscope or spectral detector according to one of claims 1-4, 6, and 12;
    wherein the micromirror arrangement is a MOEMS matrix.

27. The laser scanning microscope or spectral detector according to one of claims 1-4, 6, and 12;
    wherein an angular difference generated by the micromirror arrangement, between light components to be detected and light components to be blocked, is large enough that the beam paths of the light components to be blocked are not detected through the free aperture of the collimating optics arranged downstream.

28. The laser scanning microscope or spectral detector according to one of claims 1-4, 6, and 12;
    wherein a large-surface detector is arranged in a pupil plane of collimating optics arranged downstream of the micromirror arrangement.

29. The laser scanning microscope or spectral detector according to one of claims 1-4, 6, and 12;
    wherein the spectrally filtered sample light to be detected is imaged on a multichannel detector.

30. The laser scanning microscope or spectral detector according to claim 29;
    wherein the multichannel detector is a multichannel photomultiplier.

31. The laser scanning microscope or spectral detector according to claim 29;
    wherein the multichannel detector is a linear or two-dimensional CCD detector.

32. The laser scanning microscope or spectral detector according to claim 29;
 wherein the multichannel detector is a linear or two-dimensional EMCCD detector.

33. The laser scanning microscope or spectral detector according to claim 29;
 wherein the multichannel detector is a linear or two-dimensional CMOS detector.

* * * * *